(12) United States Patent
Dudar

(10) Patent No.: US 10,087,865 B2
(45) Date of Patent: Oct. 2, 2018

(54) REFUELING CONTROLLER

(71) Applicant: Ford Global Technologies, LLC, Dearborn, MI (US)

(72) Inventor: Aed M. Dudar, Canton, MI (US)

(73) Assignee: FORD GLOBAL TECHNOLOLGIES, LLC, Dearborn, MI (US)

( * ) Notice: Subject to any disclaimer, the term of this patent is extended or adjusted under 35 U.S.C. 154(b) by 143 days.

(21) Appl. No.: 15/213,783

(22) Filed: Jul. 19, 2016

(65) Prior Publication Data
US 2018/0023495 A1 Jan. 25, 2018

(51) Int. Cl.
| | |
|---|---|
| F02D 41/26 | (2006.01) |
| F02P 5/145 | (2006.01) |
| F02D 41/14 | (2006.01) |
| F02D 37/02 | (2006.01) |
| F02P 5/152 | (2006.01) |
| F02D 41/00 | (2006.01) |
| G05D 1/00 | (2006.01) |
| F02D 41/22 | (2006.01) |
| F02D 35/02 | (2006.01) |

(52) U.S. Cl.
CPC ......... *F02D 41/1498* (2013.01); *F02D 37/02* (2013.01); *F02D 41/0025* (2013.01); *F02D 41/26* (2013.01); *F02P 5/145* (2013.01); *F02P 5/1527* (2013.01); *G05D 1/0088* (2013.01); *F02D 35/027* (2013.01); *F02D 41/22* (2013.01)

(58) Field of Classification Search
CPC ...... F02D 41/22; F02D 41/26; F02D 41/1498; F02D 37/02; F02P 5/145

USPC ............... 123/406.11, 406.29; 701/102, 111
See application file for complete search history.

(56) References Cited

U.S. PATENT DOCUMENTS

| | | | |
|---|---|---|---|
| 6,032,703 A | 3/2000 | Baker et al. | |
| 8,099,308 B2* | 1/2012 | Uyeki | G06Q 10/02 340/539.1 |
| 2002/0193926 A1* | 12/2002 | Katagishi | G06Q 10/06 701/32.4 |
| 2007/0250452 A1 | 10/2007 | Leigh et al. | |
| 2009/0112450 A1 | 4/2009 | Connor | |
| 2009/0146846 A1 | 6/2009 | Grossman | |

(Continued)

FOREIGN PATENT DOCUMENTS

| | | |
|---|---|---|
| CN | 104240309 A | 12/2014 |
| DE | 102008055881 A1 | 5/2010 |
| JP | 2009179370 A | 8/2009 |

OTHER PUBLICATIONS

UKIPO Search Report for Application No. GB1711312.7 dated Dec. 13, 2017 (3 pages).

*Primary Examiner* — Hieu T Vo
*Assistant Examiner* — Arnold Castro
(74) *Attorney, Agent, or Firm* — Frank A. MacKenzie; Bejin Bieneman PLC

(57) ABSTRACT

A controller includes a processor and a memory storing processor-executable instructions. The processor is programmed to receive a signal indicating engine knocking, adjust an octane requirement in response to the signal, and request a fuel for refueling meeting the octane requirement. The processor may also be programmed to avoid a gas station of most recent refueling in response to the signal and retard ignition timing of a spark plug in response to the signal.

20 Claims, 3 Drawing Sheets

(56) References Cited

U.S. PATENT DOCUMENTS

2011/0120569 A1\* 5/2011 Bromberg ............. B60K 15/04
                                                137/98
2016/0139600 A1   5/2016 Delp \* cited by examiner

REFUELING CONTROLLER

BACKGROUND

Engine knocking is a phenomenon that may occur in an internal-combustion engine using spark plugs. The spark plug produces a voltage across a gap, causing a fuel-air mixture in a cylinder of the engine to combust. The timing of the ignition of the spark plug is set to a particular point in a cycle of a piston moving within the cylinder. Engine knocking is ignition of the fuel-air mixture prematurely relative to the cycle and/or ignition outside of the gap of the spark plug. Engine knocking may be caused by abnormally hot regions of the piston and/or cylinder, by fuel deposits that have built up in the engine over time, and/or by other causes. The detonations that occur during engine knocking may be audible to occupants of the vehicle or may be below the range of human hearing. Engine knocking can decrease the fuel economy of the vehicle, increase environmentally harmful emissions, annoy or concern occupants of the vehicle, and/or deteriorate the engine. There is an opportunity to provide improved vehicle engine control to reduce and/or minimize engine knocking.

DETAILED DESCRIPTION

Figure 1:
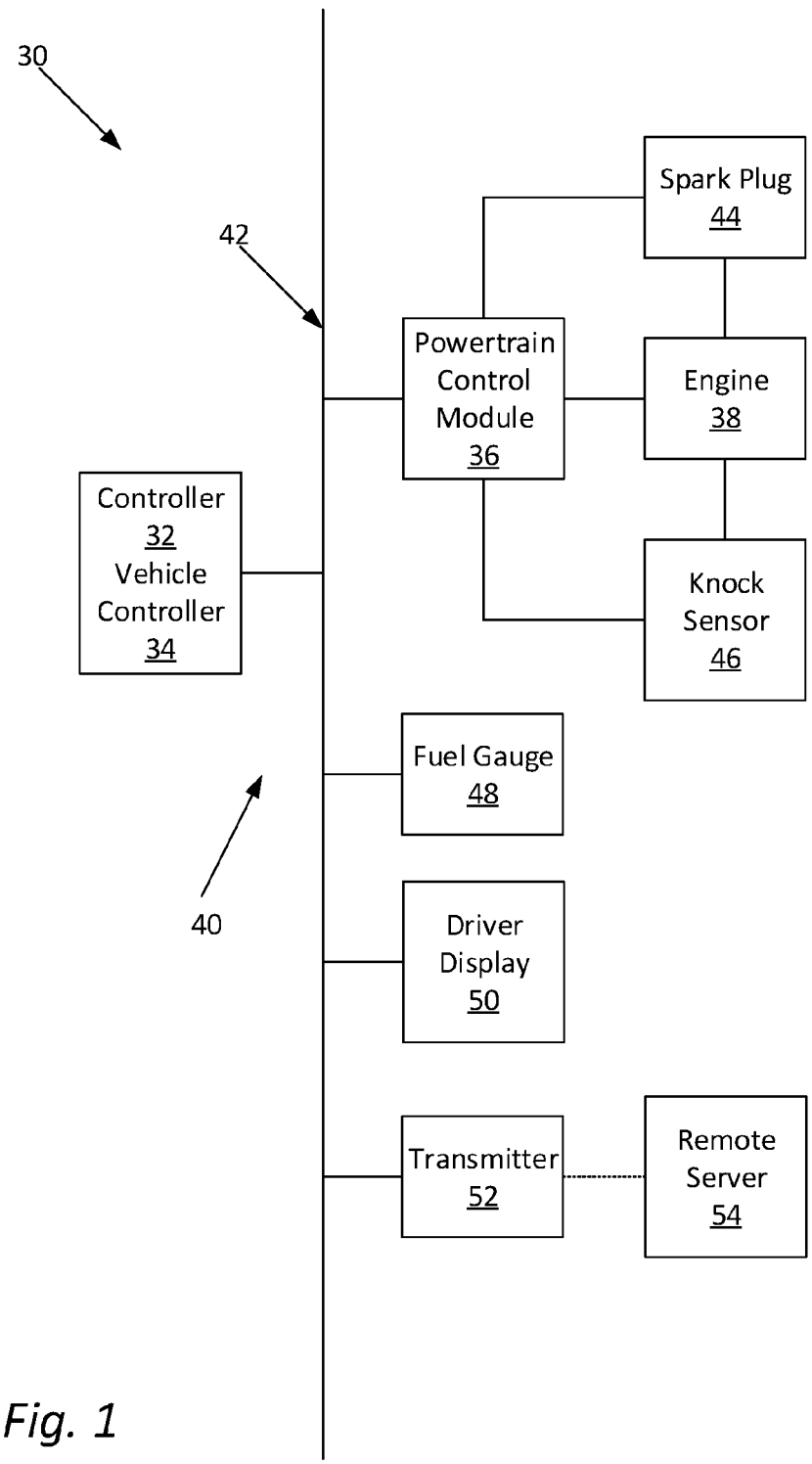
FIG. 1 is a block diagram of an example vehicle.

It is an object of the present disclosure to provide a solution that reduces risk and/or incidence of engine knocking. With reference to the Figures, wherein like numerals indicate like parts throughout the several views, a controller 32 (which may be a standalone computing device or embedded in a vehicle computing device, e.g., a vehicle controller 34 or a powertrain control module 36) includes a processor and a memory storing processor-executable instructions. The processor is programmed to receive a signal indicating engine knocking, adjust an octane requirement in response to the signal, and request a fuel for refueling meeting the octane requirement.

The present disclosure including the controller 32 as described herein provides a solution to the problem of engine knocking and improves the performance of an engine 38 of a vehicle 30 that includes the controller 32. The controller 32 can diagnose and treat engine knocking without intervention by, e.g., an occupant or a service technician. The controller 32 thus improves the performance of the engine 38, increasing fuel economy and reducing harmful emissions.

With reference to FIG. 1, the vehicle 30 may be an autonomous vehicle. The vehicle controller 34 can include what is sometimes referred to as the "virtual driver," and as such may be capable of operating the vehicle 30 independently of the intervention of a human driver, to a greater or a lesser degree. The vehicle controller 34 may be programmed to operate one or more of a propulsion system including the engine 38, a braking system, a steering system, and/or other vehicle systems.

The vehicle controller 34 is included in a control system 40 for carrying out various operations, including as described herein. The vehicle controller 34 is a computing device that generally includes a processor and a memory, the memory including one or more forms of computer-readable media, and storing instructions executable by the processor for performing various operations, including as disclosed herein. The memory of the vehicle controller 34 further generally stores remote data received via various communications mechanisms; e.g., the vehicle controller 34 is generally configured for communications on a controller area network (CAN) bus or the like, and/or for using other wired or wireless protocols, e.g., Bluetooth, etc. The vehicle controller 34 may also have a connection to an onboard diagnostics connector (OBD-II). Via a vehicle network using Ethernet, WiFi, the CAN bus, Local Interconnect Network (LIN), and/or other wired or wireless mechanisms, the vehicle controller 34 may transmit messages to various devices in the vehicle and/or receive messages from the various devices, e.g., controllers, actuators, sensors, etc., e.g., controllers and sensors as discussed herein. For example, the vehicle controller 34 may receive data from vehicle sensors. Although one vehicle controller 34 is shown in FIG. 1 for ease of illustration, it is to be understood that the vehicle controller 34 could include, and various operations described herein could be carried out by, one or more computing devices.

The control system 40 may transmit signals through a communications network 42 such as a controller area network (CAN) bus, Ethernet, Local Interconnect Network (LIN), and/or by any other wired or wireless communications network.

The powertrain control module 36 is a microprocessor-based controller. The powertrain control module 36 may include a processor, memory, etc. The memory of the powertrain control module 36 may include memory for storing instructions executable by the processor as well as for electronically storing data and/or databases. The powertrain control module 36 may be in communication with and may control the engine 38 and/or a transmission of the vehicle 30, among other functions.

The controller 32 may be a standalone device or may be embedded in one or more of the vehicle controller 34, the powertrain control module 36, and any other control module in the vehicle 30. For example, in FIG. 2, the controller 32 is depicted as embedded in the vehicle controller 34. The controller 32 may rely on one or more of the memories of, e.g., the vehicle controller 34 and the powertrain control module 36 to electronically store instructions executable by one or more of the processors of, e.g., the vehicle controller 34 and the powertrain control module 36, as well as to electronically store data and/or databases. Alternatively, the controller 32 may be a physically separate module including a separate processor, memory, etc.

The engine 38 is an internal combustion engine, possibly in a hybrid electric vehicle whose propulsion system also includes an electric motor. The engine 38 typically operates in a known manner and as such includes a plurality of cylinders (not shown). The cylinders operate as combustion chambers in which a chemical reaction of a fuel-air mixture translates into kinetic energy of a piston (not shown) of the cylinder. Each cylinder progresses through a stroke cycle. The pistons of the cylinders are coupled to the transmission such that linear movement of the pistons drives rotational motion of the transmission. The cylinders of the engine 38 fire in a predefined sequence.

Spark plugs 44 may be positioned in each cylinder of the engine 38 to ignite the fuel mixture. The spark plug 44 may produce a voltage across a gap, causing the fuel-air mixture in the cylinder to combust. Ignition timing of the spark plug 44 defines when the spark plug 44 fires relative to the stroke cycle of the cylinder.

Knock sensors 46 may be positioned in the engine 38, such as on or near the cylinders. The knock sensor 46 may be, for example, a piezoelectric sensor. The knock sensors 46 detect vibrations or sounds and compare the vibrations or sounds with, e.g., a preset table to identify whether the vibrations or sounds represent engine knocks. The knock sensors 46 may be in communication with the powertrain control module 36 or the communications network 42.

The vehicle 30 may have a fuel system with a fuel tank, a fuel-level indicator, and a fuel pump. The fuel tank stores fuel for the vehicle 30. The fuel tank contains the fuel pump, which draws fuel from the fuel tank to deliver to the engine 38, and the fuel-level indicator. The fuel-level indicator generally operates in a known manner and typically has a float, a rod, a wiper, and a variable resistor. The float is attached to an end of the rod. The rod and the wiper are fixed relative to each other and rotatably connected to the variable resistor. The float is buoyant and rests on a surface of the fuel in the fuel tank. The rod is freely rotatable relative to the variable resistor. If the float moves up or down, the rod rotates accordingly relative to the variable resistor. The wiper is positioned so that as the float moves from the top of the fuel tank to the bottom of the fuel tank, the rod rotates the wiper from one end of the variable resistor to the other end of the variable resistor. The wiper is electrically connected to a fuel gauge 48 and to the variable resistor. The variable resistor is electrically connected to the wiper and to ground. As the wiper changes position relative to the variable resistor, an electrical resistance provided by the variable resistor changes.

The fuel gauge 48 detects a quantity of fuel remaining in the fuel tank. The fuel gauge 48 may detect a level of current flowing through the wiper and the variable resistor to ground. The current changes as the resistance changes, and the fuel gauge 48 translates the current to a fuel level.

A driver display 50 presents information to an occupant of the vehicle 30. The driver display 50 may be located, e.g., on an instrument panel in a passenger cabin of the vehicle 30, or wherever may be readily seen by the occupant. The driver display 50 may include dials, digital readouts, screens, etc.

A transmitter 52 may be connected to the communications network 42. The transmitter 52 may be adapted to transmit signals wirelessly through any suitable wireless communication protocol, such as Bluetooth, WiFi, 802.11a/b/g, radio, etc. The transmitter 52 may be adapted to communicate with a remote server 54, that is, a server distinct and spaced from the vehicle 30. The remote server 54 may be located outside the vehicle 30. For example, the remote server 54 may be associated with other vehicles (e.g., V2V communications), infrastructure components (e.g., V2I communications), emergency responders, towing companies, etc.

Figure 2:
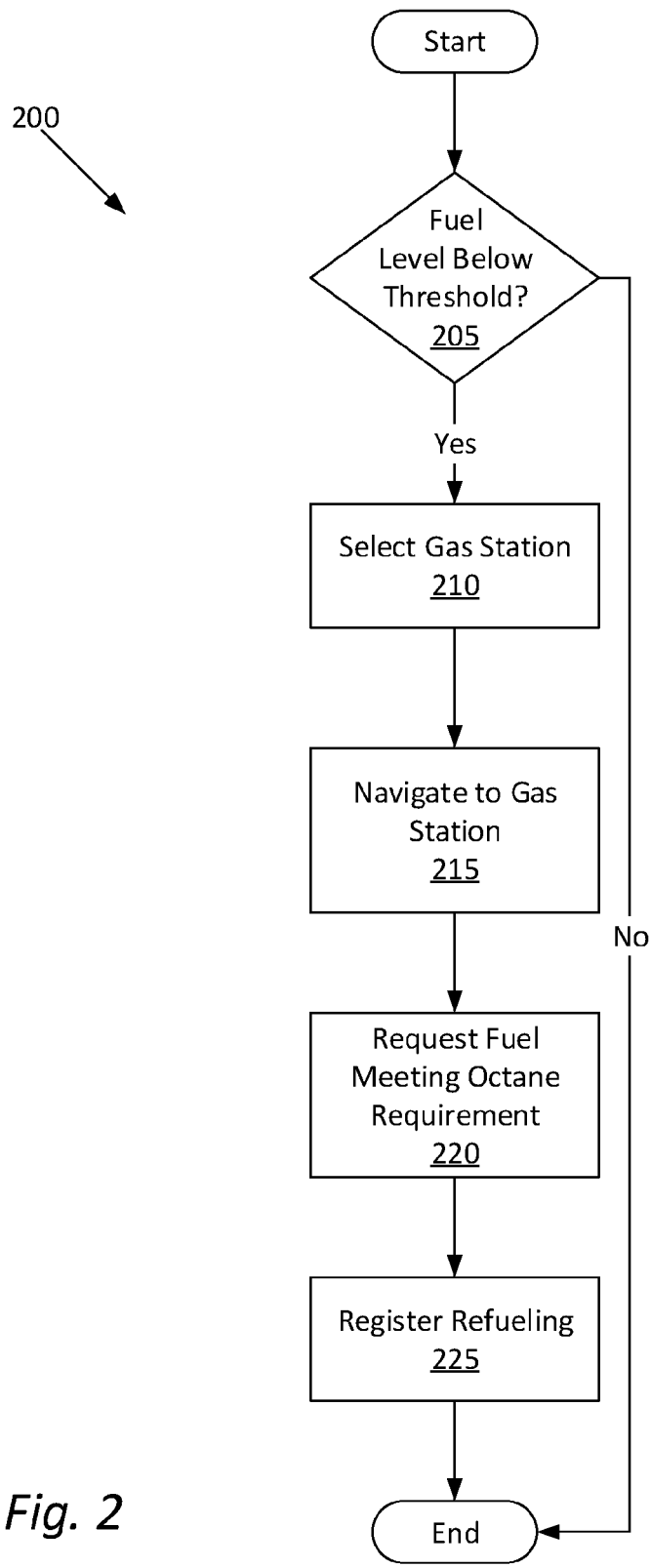
FIG. 2 is a process flow diagram of an exemplary process for refueling the vehicle of FIG. 1.

FIG. 2 is a process flow diagram illustrating an exemplary process 200 for refueling the vehicle 30. The process 200 begins in a decision block 205, in which the controller 32 determines whether the fuel level in the fuel tank is below a preset threshold, for example, 25% full. The fuel gauge 48 reports the fuel level to the controller 32. If the fuel level is above the threshold, the process 200 ends. If the fuel level is below the threshold, the process 200 proceeds to a block 210.

Next, if the fuel level is below the threshold, in the block 210, the controller 32 selects a gas station. The controller 32 may select a gas station based on, for example, proximity to the current location, proximity a planned route, posted price for fuel, online reviews, preferences input by an owner of the vehicle 30, etc. In particular, if the controller 32 has previously designated a gas station for avoidance, then the controller 32 excludes that gas station from selection.

Next, in a block 215, the controller 32 navigates the vehicle 30 to the selected gas station. If the vehicle 30 is autonomous, that is, the vehicle controller 34 can operate the propulsion, steering, and braking independent of human input, the controller 32 may both plan the route and operate the vehicle 30 along the route to the gas station. If the vehicle 30 is not autonomous or is not being driven autonomously, the controller 32 may transmit the location of and/or directions to the gas station to the driver display 50.

Next, in a block 220, the controller 32 requests a fuel for refueling meeting an octane requirement. The octane requirement is a minimum or mandated octane level of the fuel for the vehicle 30. The controller 32 typically stores the octane requirement. If the gas station supports autonomous refueling, the controller 32 may send a message to the gas station via the transmitter 52 requesting a fuel meeting the octane requirement, which the gas station may then provide. If the gas station does not support autonomous refueling, that is, if the gas station needs a human to pump the fuel into the vehicle 30, then the controller 32 may transmit a message including the octane requirement to, e.g., the driver display 50.

Next, in a block 225, the controller 32 registers that a refueling has occurred. The controller 32 may, e.g., switch the value of a refueling variable or store the date and time at which the refueling occurred.

Figure 3:
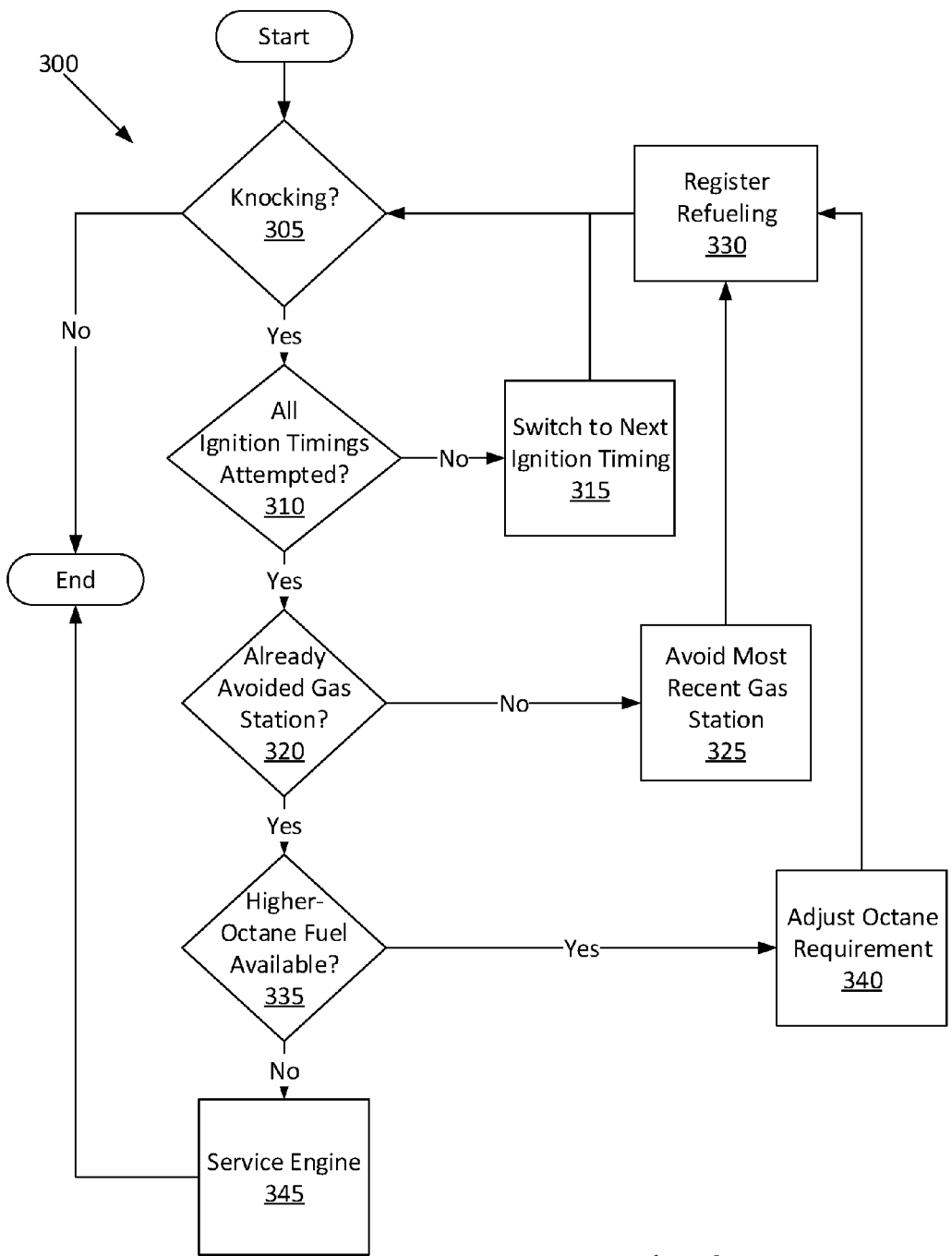
FIG. 3 is a process flow diagram of an exemplary process for reducing engine knocking in the vehicle of FIG. 1.

FIG. 3 is a process flow diagram illustrating an exemplary process 300 for mitigating engine knock. The process 300 begins in a decision block 305, in which the controller 32 receives a signal from the knock sensor 46. Alternatively, the controller 32 may receive a signal from, e.g., a microphone or other sound recording device for, e.g., receiving commands from occupants if the vehicle 30 is not equipped with a knock sensor 46. If the controller 32 does not receive a signal indicating engine knocking, the process 300 ends. If the controller 32 receives a signal indicating engine knocking, the process 300 proceeds to a decision block 310.

The process 300 may pass through the decision block 305 multiple times before successfully addressing engine knocking. The controller 32 may receive a second signal indicating engine knocking after retarding the ignition timing, described below with respect to a block 315; after a refueling after avoiding a gas station of most recent refueling, described below with respect to a block 325; or after a refueling after adjusting the octane requirement, described below with respect to a block 340.

Next, if engine knocking is present, in the decision block 310, the controller 32 determines whether all ignition timings have been attempted, that is, whether retarding ignition timing of the spark plugs 44 is an available strategy. For example, the controller 32 may store a sequence of possible ignition timings. The sequence of ignition timings may include a discrete list of ignition timings that, for example, are unlikely to cause a misfire. If at least one ignition timing has not been tried, the process 300 proceeds to the block 315. If all ignition timings have been previously attempted, the process 300 proceeds to a decision block 320.

If the controller 32 has not tried all ignition timings in the stored sequence, in the block 315, the controller 32 retards the ignition timing of the spark plugs 44 in response to the signal from the knock sensor 46. The controller 32 may select an ignition timing from the sequence of possible ignition timings by switching to the next ignition timing after the current ignition timing. After the block 315, the process 300 proceeds back to the decision block 305 to retest the occurrence of engine knocking.

After the decision block 310 if all ignition timings have been attempted, in the decision block 320, the controller 32 determines whether the vehicle 30 has refueled at a second gas station since engine knocking was first detected. If the vehicle 30 has already visited multiple gas stations and engine knocking is still occurring, the gas from a particular gas station is unlikely to be the cause of the engine knocking. If the vehicle 30 has not already avoided a gas station, the process 300 proceeds to the block 325. If the vehicle 30 has already avoided a gas station, the process 300 proceeds to a decision block 335.

Next, if the vehicle 30 has not already avoided a gas station, in the block 325, then the controller 32 avoids a gas station of most recent refueling in response to the signal. The controller 32 executes the command to avoid a gas station of most recent refueling in response to the signal after executing the command to retard ignition timing of the spark plug 44 in response to the signal. The controller 32 may store a list of gas stations to avoid and update that list to include the gas station that the vehicle 30 last visited.

Next, in a block 330, the controller 32 registers that a refueling has occurred, e.g., as described above with respect to the block 225 of the process 200. After the block 330, the process 300 proceeds back to the decision block 305 to retest the occurrence of engine knocking.

After the decision block 320, if the vehicle 30 has already avoided a gas station, in the decision block 335, the controller 32 determines whether the octane requirement is at a maximum available octane requirement. The maximum available octane requirement may be determined by, for example, fuel offerings at nearby gas stations. If all nearby gas stations offer, e.g., 87, 91, and 93 octane gasoline, then the maximum available octane requirement is 93 octane. If the octane requirement is at, e.g., 87 or 91 octane, then a higher-octane fuel is available. If the octane requirement is at, e.g., 93 octane, then the octane requirement is at a maximum available octane requirement.

Next, if the octane requirement is not at a maximum available octane requirement, in the block 340, the controller 32 adjusts the octane requirement in response to the signal. The controller 32 executes the command to adjust the octane requirement in response to the signal after executing the command to avoid the gas station of most recent refueling in response to the signal. Adjusting the octane requirement may mean increasing the octane requirement, for example, from 87 octane to 91 octane or from 91 octane to 93 octane.

Specifically, adjusting the octane may mean selecting the next highest available octane requirement. For example, if the octane requirement is at 87 octane, the controller 32 may select 89 octane if nearby gas stations carry both 89 and 91 octane but select 91 octane if nearby gas stations carry 91 octane but not 89 octane. The process 300 may pass through the block 340 multiple times, for example, adjusting from 87 octane to 91 octane in response to a first signal indicating knocking and adjusting again from 91 octane to 93 octane in response to a second signal indicating knocking. After the block 340, the process 300 proceeds to the block 330, described above.

After the decision block 335, if the vehicle 30 is already operating with fuel of the maximum available octane requirement, in a block 345, the controller 32 then requests an engine servicing in response to the signal. If the vehicle 30 is autonomous, that is, the vehicle controller 34 can operate the propulsion, steering, and braking independent of human input, the vehicle 30 may navigate itself to repair shop or dealership and transmit a message requesting service via the transmitter 52. If the vehicle 30 is not autonomous or not being driven autonomously, then the controller 32 may transmit a message request engine servicing to, e.g., the driver display 50. The driver display 50 may turn on a "check engine" light or may show a message stating that servicing is recommended. After the block 345, the process 300 ends.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
receiving a first signal indicating engine knocking;
adjusting an octane requirement for refueling in response to the signal;
requesting a fuel for refueling meeting the octane requirement; and
requesting an engine servicing upon receiving second and third signals indicating engine knocking, the second signal occurring between refueling at a gas station and a next refueling, the third signal occurring between refueling at a different gas station and a next refueling.

2. The method of claim 1, further comprising avoiding a gas station of most recent refueling in response to the first signal.

3. The method of claim 2, wherein adjusting the octane requirement in response to the first signal occurs after avoiding the gas station of most recent refueling in response to the first signal.

4. The method of claim 3, further comprising retarding ignition timing of a spark plug in response to the first signal.

5. The method of claim 4, wherein avoiding the gas station of most recent refueling in response to the first signal occurs after retarding ignition timing of a spark plug in response to the signal.

6. The method of claim 5, further comprising determining that the octane requirement is at a maximum available octane requirement; and then requesting an engine servicing in response to the first signal.

7. The method of claim 1, further comprising retarding ignition timing of a spark plug in response to the first signal.

8. The method of claim 7, wherein adjusting the octane requirement in response to the first signal occurs after retarding ignition timing of the spark plug in response to the first signal.

9. The method of claim 1, further comprising determining that the octane requirement is at a maximum available octane requirement; and then requesting an engine servicing in response to the first signal.

10. The method of claim 1, further comprising receiving a fourth signal indicating engine knocking after a refueling after adjusting the octane requirement, and adjusting the octane requirement in response to the fourth signal.

11. A controller comprising a processor and a memory storing processor executable instructions, wherein the processor is programmed to:
receive a first signal indicating engine knocking;
adjust an octane requirement for refueling in response to the signal;
request a fuel for refueling meeting the octane requirement; and
request an engine servicing upon receiving second and third signals indicating engine knocking, the second signal occurring between refueling at a gas station and a next refueling, the third signal occurring between refueling at a different gas station and a next refueling.

12. The controller of claim 11, wherein the processor is further programmed to avoid a gas station of most recent refueling in response to the first signal.

13. The controller of claim 12, wherein the processor is programmed to execute the command to adjust the octane requirement in response to the first signal after executing the command to avoid a gas station of most recent refueling in response to the first signal.

14. The controller of claim 13, wherein the processor is further programmed to retard ignition timing of a spark plug in response to the first signal.

15. The controller of claim 14, wherein the processor is programmed to execute the command to avoid a gas station of most recent refueling in response to the first signal after executing the command to retard ignition timing of a spark plug in response to the first signal.

16. The controller of claim 15, wherein the processor is further programmed to determine that the octane requirement is at a maximum available octane requirement; and then request an engine servicing in response to the first signal.

17. The controller of claim 11, wherein the processor is further programmed to retard ignition timing of a spark plug in response to the first signal.

18. The controller of claim 17, wherein the processor is programmed to execute the command to adjust the octane requirement in response to the first signal after executing the command to retard ignition timing of a spark plug in response to the first signal.

19. The controller of claim 11, wherein the processor is further programmed to determine that the octane requirement is at a maximum available octane requirement; and then request an engine servicing in response to the first signal.

20. The controller of claim 11, wherein the processor is further programmed to receive a fourth signal indicating engine knocking after a refueling after executing the command to adjust the octane requirement, and adjust the octane requirement in response to the fourth signal.

* * * * *